(12) United States Patent
Kim et al.

(10) Patent No.: US 11,820,189 B2
(45) Date of Patent: Nov. 21, 2023

(54) VEHICLE SUSPENSION CONTROL APPARATUS AND METHOD THEREOF

(71) Applicants: Hyundai Motor Company, Seoul (KR); Kia Corporation, Seoul (KR)

(72) Inventors: Hyung Jin Kim, Seoul (KR); Sung Ki Jung, Seoul (KR); Dong Hun Lim, Gyeonggi-do (KR); Yoon Kab Noh, Gyeonggi-do (KR); Jong Hoon Choi, Gyeonggi-do (KR); Young Jae Kim, Gyeonggi-do (KR); In Yong Jung, Incheon (KR); Byung Joo Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 148 days.

(21) Appl. No.: 17/675,574

(22) Filed: Feb. 18, 2022

(65) Prior Publication Data

US 2023/0027706 A1 Jan. 26, 2023

(30) Foreign Application Priority Data

Jul. 22, 2021 (KR) .................. 10-2021-0096664

(51) Int. Cl.
*B60G 17/016* (2006.01)
*B60G 17/0165* (2006.01)

(52) U.S. Cl.
CPC .... *B60G 17/0165* (2013.01); *B60G 2400/204* (2013.01); *B60G 2400/823* (2013.01)

(58) Field of Classification Search
CPC .......... B60G 17/0165; B60G 2400/204; B60G 2400/823; B60G 2400/82; B60G 17/018
See application file for complete search history.

(56) References Cited

U.S. PATENT DOCUMENTS 8,762,000 B2 * 6/2014 Schindler

FOREIGN PATENT DOCUMENTS

| KR | 10-2019-0128290 A | 11/2019 |
| KR | 10-2021-0022296 A | 3/2021 |

* cited by examiner

*Primary Examiner* — Xiao En Mo
(74) *Attorney, Agent, or Firm* — Fox Rothschild LLP (57) ABSTRACT

A vehicle suspension control apparatus includes a mode determination device that determines a suspension control mode corresponding to an identified front road surface, in response to the front road surface of a vehicle being identified, a suspension control amount calculation device that calculates an amount of suspension control for passing through the identified front road surface, based on the determined suspension control mode, and a controller that controls a suspension of the vehicle based on the calculated amount of suspension control.

20 Claims, 5 Drawing Sheets

VEHICLE SUSPENSION CONTROL APPARATUS AND METHOD THEREOF

CROSS-REFERENCE TO RELATED APPLICATION

This application claims under 35 U.S.C. § 119(a) the benefit of Korean Patent Application No. 10-2021-0096664, filed in the Korean Intellectual Property Office on Jul. 22, 2021, the entire contents of which are incorporated herein by reference.

BACKGROUND

(a) Technical Field

The present disclosure relates to a vehicle suspension control apparatus and a method thereof.

(b) Description of the Related Art

An electronic control suspension (ECS), which is a vehicle body control system included in a vehicle, may change a height of a vehicle body depending on a state of a front road surface to provide a driver (or a user) of the vehicle with ride comfort and/or stability. For example, when the vehicle drives over a speed bump located in a driving direction of the vehicle, the ECS included in the vehicle may control a suspension of the vehicle to reduce a shock of the vehicle body delivered to the driver. However, when the ECS does not predict a behavior of the vehicle in response to a shock applied to the vehicle, it may fail to provide accurate and safe suspension control.

Furthermore, when the vehicle passes over a front road surface, when controlling the suspension of the vehicle while not considering a speed of the vehicle passing over the front road surface, the ECS may fail to provide accurate and safe suspension control.

SUMMARY

An aspect of the present disclosure provides an apparatus and a method for predicting a behavior of a vehicle and controlling a suspension of the vehicle, when the vehicle passes over a front road surface.

Furthermore, another aspect of the present disclosure provides an apparatus and a method for controlling the suspension with respect to a speed of the vehicle, when the vehicle passes over the front road surface.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a vehicle suspension control apparatus may include a mode determination device that determines a suspension control mode corresponding to an identified front road surface, in response to the front road surface of a vehicle being identified, a suspension control amount calculation device that calculates an amount of suspension control for passing through the identified front road surface, based on the determined suspension control mode, and a controller that controls a suspension of the vehicle based on the calculated amount of suspension control.

Furthermore, according to embodiments, the suspension control mode may indicate one of a first mode, a second mode, or a third mode. The amount of suspension control may be calculated based on one of the first mode, the second mode, or the third mode.

Furthermore, according to embodiments, an amount of suspension control calculated based on the first mode may be greater than an amount of suspension control calculated based on the second mode. An amount of suspension control calculated based on the third mode may be less than the amount of suspension control calculated based on the second mode.

Furthermore, according to embodiments, the suspension control mode may be determined as one of the first mode, the second mode, or the third mode based on a count value for the first mode, a count value for the second mode, and a count value for the third mode. The count value may indicate a value counted in response to the suspension control mode corresponding to the identified front road surface being determined.

Furthermore, according to embodiments, the suspension control mode may be determined based on the largest count value among the count value for the first mode, the count value for the second mode, and the count value for the third mode.

Furthermore, according to embodiments, the suspension control mode may be determined based on a difference value between the count value for the first mode and the count value for the second mode, a difference value between the count value for the second mode and the count value for the third mode, and a difference value between the count value for the third mode and the count value for the first mode.

Furthermore, according to embodiments, the count value for the first mode, the count value for the second mode, and the count value for the third mode may be counted based on a speed of the vehicle entering the identified front road surface.

Furthermore, according to embodiments, the count value for the first mode may be counted in response to the speed of the vehicle entering the identified front road surface being greater than or equal to a predetermined first value. The count value for the third mode may be counted in response to the speed of the vehicle entering the identified front road surface being less than or equal to a predetermined second value. The predetermined first value may be greater than the predetermined second value. The count value for the second mode may be counted in response to the speed of the vehicle entering the identified front road surface being greater than the predetermined second value or less than the predetermined first value.

Furthermore, according to embodiments, the amount of suspension control may include at least one of an amount of control for a speed offset of the vehicle, an amount of control for a bump of the vehicle, or an amount of control for a sky hook of the vehicle.

Furthermore, according to embodiments, the identified front road surface may include a road surface on which a speed bump is installed.

According to another aspect of the present disclosure, a vehicle suspension control method may include determining a suspension control mode corresponding to an identified front road surface, when the front road surface of a vehicle is identified, calculating an amount of suspension control for passing through the identified front road surface, based on the determined suspension control mode, and controlling a suspension of the vehicle based on the calculated amount of suspension control.

Furthermore, according to embodiments, the suspension control mode may indicate one of a first mode, a second mode, or a third mode. The amount of suspension control may be calculated based on one of the first mode, the second mode, or the third mode.

Furthermore, according to embodiments, an amount of suspension control calculated based on the first mode may be greater than an amount of suspension control calculated based on the second mode. An amount of suspension control calculated based on the third mode may be less than the amount of suspension control calculated based on the second mode.

Furthermore, according to embodiments, the suspension control mode may be determined as one of the first mode, the second mode, or the third mode based on a count value for the first mode, a count value for the second mode, and a count value for the third mode. The count value may indicate a value counted in response to the suspension control mode corresponding to the identified front road surface being determined.

Furthermore, according to embodiments, the suspension control mode may be determined based on the largest count value among the count value for the first mode, the count value for the second mode, and the count value for the third mode.

Furthermore, according to embodiments, the suspension control mode may be determined based on a difference value between the count value for the first mode and the count value for the second mode, a difference value between the count value for the second mode and the count value for the third mode, and a difference value between the count value for the third mode and the count value for the first mode.

Furthermore, according to embodiments, the count value for the first mode, the count value for the second mode, and the count value for the third mode may be counted based on a speed of the vehicle entering the identified front road surface.

Furthermore, according to embodiments, the count value for the first mode may be counted in response to the speed of the vehicle entering the identified front road surface being greater than or equal to a predetermined first value. The count value for the third mode may be counted in response to the speed of the vehicle entering the identified front road surface being less than or equal to a predetermined second value. The predetermined first value may be greater than the predetermined second value. The count value for the second mode may be counted in response to the speed of the vehicle entering the identified front road surface being greater than the predetermined second value or less than the predetermined first value.

Furthermore, according to embodiments, the amount of suspension control may include at least one of an amount of control for a speed offset of the vehicle, an amount of control for a bump of the vehicle, or an amount of control for a sky hook of the vehicle.

Furthermore, according to embodiments, the identified front road surface may include a road surface on which a speed bump is installed.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some embodiments of the present disclosure will be described in detail with reference to the accompanying drawings. In adding the reference numerals to the components of each drawing, it should be noted that the identical component is designated by the identical numerals even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Furthermore, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described in detail with reference to FIGS. 1 to 5.

Figure 1:
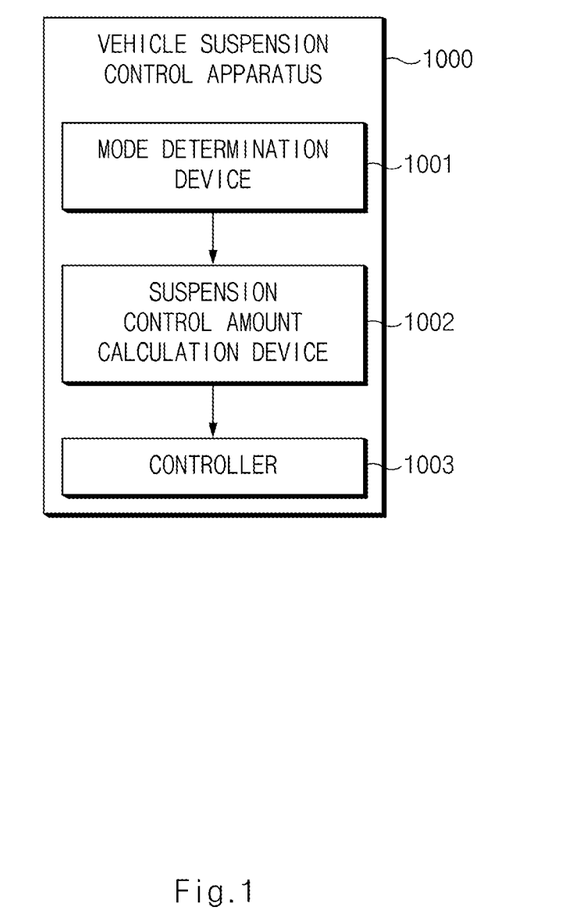
FIG. 1 illustrates a vehicle suspension control apparatus according to embodiments.

FIG. 1 illustrates a vehicle suspension control apparatus 1000 according to embodiments.

FIG. 1 is a block diagram illustrating an example of the vehicle suspension control apparatus (or the apparatus) 1000 according to embodiments.

An electronic control suspension (ECS), which is a vehicle body control system included in a vehicle, may change a height of a vehicle body depending on a state of a front road surface to provide a driver (or a user) of the vehicle with ride comfort and/or stability. For example, when the vehicle drives on a speed bump located in its driving direction, the ECS included in the vehicle may control a suspension of the vehicle to reduce a shock of the vehicle body delivered to the driver. However, when the ECS does not predict a behavior of the vehicle in response to a shock to be applied to the vehicle, it may fail to provide accurate and safe suspension control.

Furthermore, when the vehicle passes over the front road surface, when controlling the suspension of the vehicle while not considering a speed of the vehicle passing through the front road surface, the ECS may fail to provide accurate and safe suspension control.

The apparatus 1000 according to embodiments may provide an apparatus or a method for predicting a behavior of the vehicle and controlling the suspension, when the vehicle passes over a front road surface. Furthermore, the apparatus 1000 according to embodiments may provide an apparatus or a method for controlling the suspension with respect to a speed of the vehicle, when the vehicle passes over the front road surface.

The vehicle suspension control apparatus 1000 according to embodiments may include a mode determination device 1001, a suspension control amount calculation device 1002, and/or a controller 1003. The apparatus 1000 according to embodiments may be included inside or outside the vehicle. The apparatus 1000 according to embodiments may further include one or more elements which is or are not shown in FIG. 1.

The vehicle according to embodiments may identify a road surface located in a driving direction of the vehicle (e.g., in front of the vehicle), while the vehicle is traveling. The vehicle may identify a speed bump located in front of the vehicle based on a light detection and ranging (LiDAR), a camera, and/or a time of flight (TOF) sensor included in the vehicle.

The mode determination device 1001 according to embodiments may determine a suspension control mode corresponding to an identified front road surface of the vehicle, in response to the front road surface of the vehicle is identified. The identified front road surface according to embodiments may include a road surface on which a speed bump is installed.

The suspension control mode according to embodiments may be a mode in which the suspension of the vehicle passing through the front road surface is controlled. In other words, the suspension control mode according to embodiments may be determined according to a type (e.g., a height or the like) of the identified front road surface and/or a speed of the vehicle passing through the identified front road surface.

The suspension control amount calculation device 1002 according to embodiments may calculate an amount of suspension control for passing through the identified front road surface, based on the determined suspension control mode. The amount of suspension control according to embodiments may be an amount of control for decelerating the vehicle. For example, the larger the amount of suspension control, the more the speed of the vehicle may decrease.

The suspension control mode according to embodiments may indicate one of a first mode, a second mode, or a third mode. Thus, the amount of suspension control according to embodiments may be calculated based on one of the first mode, the second mode, or the third mode. The first mode, the second mode, and the third mode may be modes classified according to the amount of suspension control. For example, the amount of suspension control calculated based on the first mode may be greater than the amount of suspension control calculated based on the second mode, and the amount of suspension control calculated based on the third mode may be less than the amount of suspension control calculated based on the second mode.

The controller 1003 according to embodiments may control the suspension of the vehicle based on the calculated amount of suspension control.

Through the method described herein, the apparatus 1000 according to embodiments may decelerate the vehicle based on the amount of suspension control based on a suitable suspension control mode, in response to the front road surface being identified while the vehicle is traveling. In particular, the apparatus 1000 may determine a suitable suspension control mode in response to a speed of the vehicle passing through the identified front road surface and may accurately and safely decelerate the vehicle.

Figure 2:
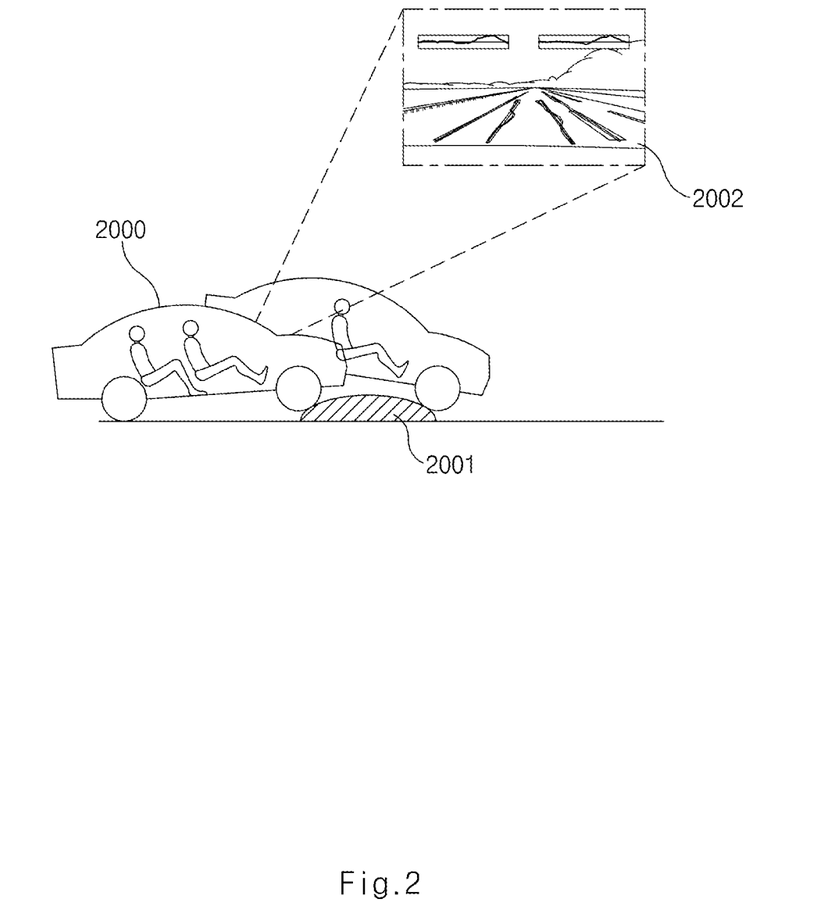
FIG. 2 is a drawing illustrating an operation of a vehicle entering a front road surface according to embodiments.

FIG. 2 is a drawing illustrating an operation of a vehicle entering a front road surface according to embodiments.

FIG. 2 is a drawing illustrating an operation of a vehicle 2000 entering a front road surface 2001 (e.g., a front road surface described in FIG. 1) according to embodiments.

As described above with reference to FIG. 1, the apparatus 1000 may calculate the amount of suspension control for decelerating the vehicle passing through the identified front road surface, in response to the front road surface being located in a driving direction (e.g., a road surface on which a speed bump is installed) while the vehicle is traveling.

Reference number 2002 may be a screen captured such that the vehicle according to embodiments identifies a front road surface on which the above-mentioned speed bump is installed. As described above, the vehicle may identify the speed bump based on a LiDAR, a camera, and/or a TOF sensor.

As described above with reference to FIG. 1, the suspension control mode according to embodiments may be determined in response to the identified front road surface. For example, the suspension control mode may be determined according to a type of a speed bump installed on the identified front road surface and a speed of the vehicle passing through the speed bump.

For example, when identifying the speed bump, the vehicle (or the apparatus 1000) may identify a type of the speed bump and may determine the suspension control mode corresponding to the type of the speed bump. The vehicle may determine the suspension control mode a plurality of number of times with respect to the speed bump. The vehicle may determine the suspension control mode depending on the suspension control mode determined a plurality of number of times, in response to the same type of speed bump being subsequently identified. The apparatus 1000 may further consider a speed of the vehicle passing through the speed bump in determining the suspension control mode.

For example, the apparatus 1000 may determine the suspension control mode based on count values for the above-mentioned modes (e.g., the first to third modes described above with reference to FIG. 1). In other words, the suspension control mode may be determined based on a count value for the first mode, a count value for the second mode, and a count value for the third mode. A count value for a specific mode may be counted, when the vehicle determines the specific mode. In other words, when the vehicle determines the first mode in response to the identified front road surface, the count value for the first mode may be counted (e.g., by +1). In other words, the count value may indicate a value counted in response to the suspension control mode corresponding to the identified front road surface being determined.

Through the method described herein, the apparatus 1000 according to embodiments may decelerate the vehicle based on the amount of suspension control based on a suitable suspension control mode, in response to the front road surface being identified while the vehicle is traveling. In particular, the apparatus 1000 may determine a suitable suspension control mode in response to a speed of the vehicle passing through the identified front road surface and may accurately and safely decelerate the vehicle.

Figure 3:
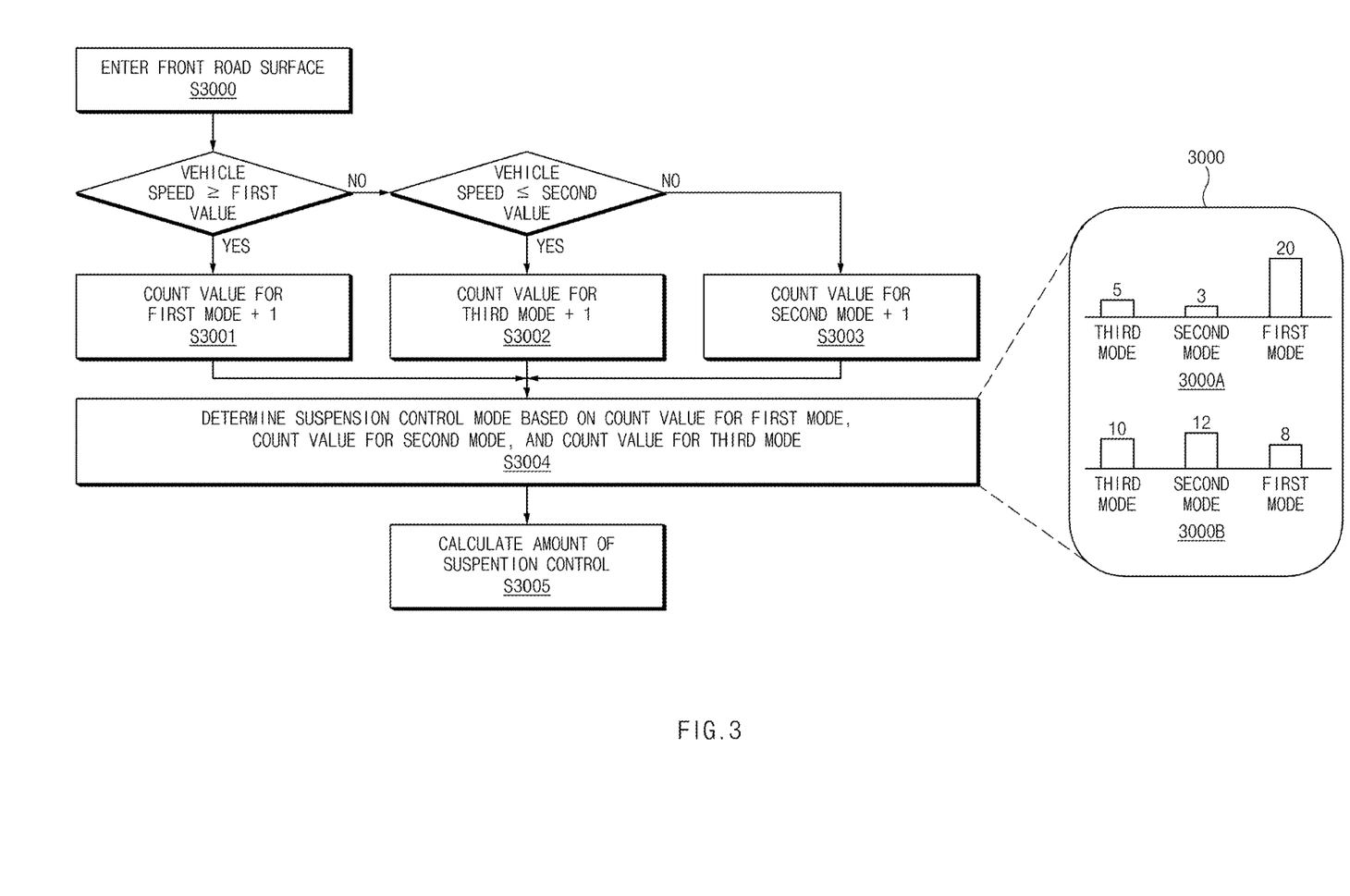
FIG. 3 is a drawing illustrating an example of an operation where a mode determination device determines a suspension control mode according to embodiments.

FIG. 3 is a drawing illustrating an example of an operation where a mode determination device 1001 determines a suspension control mode according to embodiments.

FIG. 3 is a flowchart illustrating an example of an operation where a mode determination device (e.g., the mode determination device 1001 of FIG. 1) determines a suspension control mode (e.g., a suspension control mode described in FIGS. 1 and 2) according to embodiments.

As described above with reference to FIG. 2, the suspension control mode may be determined as the first mode, the second mode, or the third mode based on the count value for the first mode, the count value for the second mode, and the count value for the third mode. The count value according to embodiments may indicate a value counted in response to the suspension control mode corresponding to the identified front road surface being determined.

According to embodiments, the count value for the first mode, the count value for the second mode, and the count value for the third mode may be counted based on a type of the identified front road surface and/or a speed of a vehicle passing through the identified front road surface. For example, an apparatus 1000 of FIG. 1 may determine the suspension control mode depending on a front road surface on which a speed bump complying with Ministry of Construction and Transportation 1, a speed bump complying with Ministry of Construction and Transportation 2, a speed bump complying with Ministry of Construction and Transportation 3, a barrel bump, or a navigation speed bump is installed.

In S3000, the vehicle according to embodiments may enter the identified front road surface.

According to embodiments, the count value for the first mode, the count value for the second mode, and the count value for the third mode may be counted based on a speed of the vehicle entering the identified front road surface.

In S3001, the count value for the first mode according to embodiments may be counted in response to the speed of the vehicle entering the identified front road surface being greater than or equal to a predetermined first value. Furthermore, in S3002, the count value for the third mode according to embodiments may be counted in response to the speed of the vehicle entering the identified front road surface being less than or equal to a predetermined second value. Furthermore, in S3003, the count value for the second mode according to embodiments may be counted in response to a speed of the vehicle entering the identified front road surface being greater than the predetermined second value and less than the predetermined first value.

According to embodiments, the predetermined first value may be greater than the predetermined second value. In other words, that the count value for the first mode is counted may refer to the speed of the vehicle traveling on the front road surface being a high speed. That the count value for the third mode is counted may refer to the speed of the vehicle traveling on the front road surface being a low speed.

Thus, as described above with reference to FIG. 1, the amount of suspension control calculated based on the first mode may be greater than the amount of suspension control calculated based on the second mode. Furthermore, the amount of suspension control calculated based on the third mode according to embodiments may be less than the amount of suspension control calculated based on the second mode.

In S3005, the suspension control mode according to embodiments may be determined based on the count value for the first mode, the count value for the second mode, and the count value for the third mode.

Reference number 3000 corresponds to a method wherein the suspension control mode according to embodiments is determined based on the count value for the first mode, the count value for the second mode, and the count value for the third mode.

The suspension control mode according to embodiments may be determined based on the largest count value among the count value for the first mode, the count value for the second mode, and the count value for the third mode.

For example, as shown in 3000A, the suspension control mode may be counted a total of 30 times, and the first mode thereof may be counted a total of 20 times. In this case, the mode determination device 1001 may determine (or count) the first mode before the vehicle enters the front road surface, in response to the same type of front road surface being identified later.

The suspension control mode according to embodiments may be determined based on a difference value between the count value for the first mode and the count value for the second mode, a difference value between the count value for the second mode and the count value for the third mode, and a difference value between the count value for the third mode and the count value for the first mode.

For example, as shown in 3000B, the suspension control mode may be determined a total of 30 times, the difference value between the count value for the first mode and the count value for the second mode may be 4, the difference value between the count value for the second mode and the count value for the third mode may be 2, and the difference value between the count value for the third mode and the count value for the first mode may be 2. In this case, because a difference in count value between the modes is not large, the mode determination device 1001 may determine (or count) the second mode before the vehicle enters the front road surface, in response to the same type of front road surface being identified later.

In S3005, a suspension control amount calculation device (e.g., a suspension control amount calculation device 1002 of FIG. 1) according to embodiments may calculate an amount of suspension control for passing through the identified front road surface, based on the determined suspension control mode.

Through the method described in FIG. 3, the apparatus 1000 according to embodiments may decelerate the vehicle based on the amount of suspension control based on a suitable suspension control mode, in response to the front road surface being identified while the vehicle is traveling. In particular, the apparatus 1000 may determine a suitable suspension control mode in response to a speed of the vehicle passing through the identified front road surface and may accurately and safely decelerate the vehicle.

Figure 4:
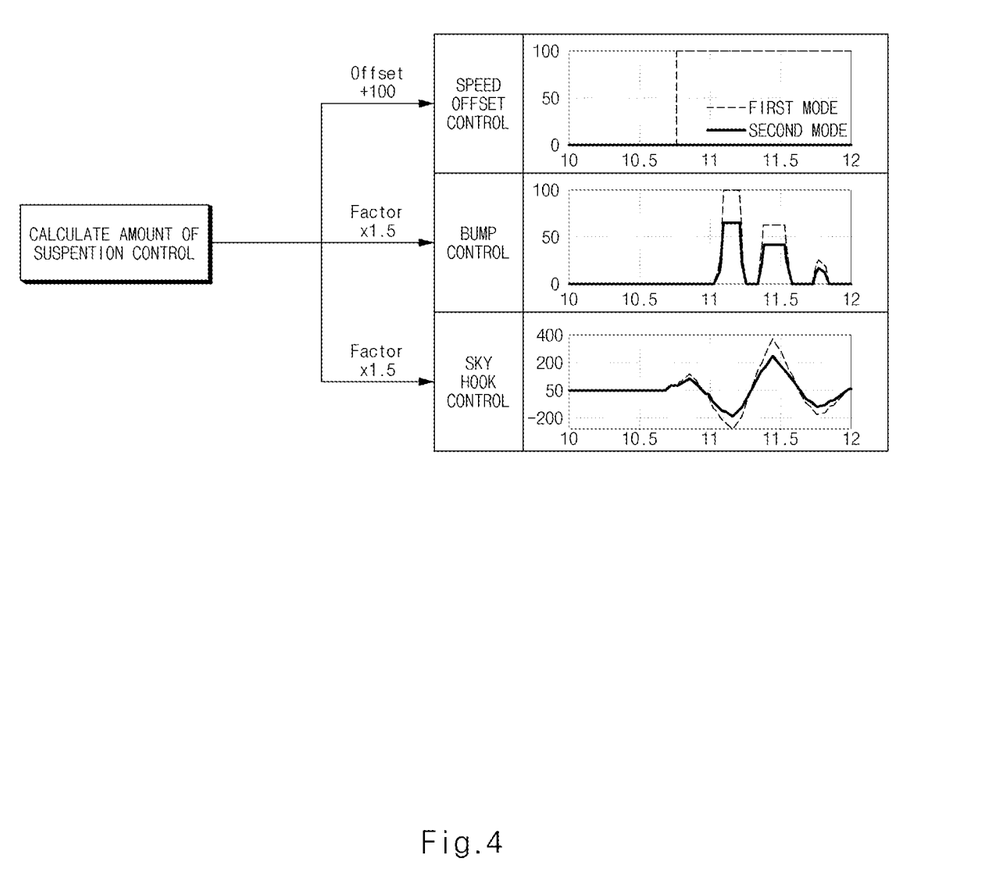
FIG. 4 is a drawing illustrating an example of an operation where a suspension control amount calculation device calculates an amount of suspension control according to embodiments.

FIG. 4 is a drawing illustrating an example of an operation where a suspension control amount calculation device 1002 calculates an amount of suspension control according to embodiments.

In particular, FIG. 4 illustrates an example of an operation where a suspension control amount calculation device (e.g., the suspension control amount calculation device 1002 described in FIGS. 1 and 3) calculates an amount of suspension control according to embodiments. The operation of calculating the amount of suspension control in the suspension control amount calculation device 1002 described in FIG. 4 may be an operation of calculating the amount of suspension control according to the determined suspension control mode before the vehicle enters the front road surface, when the same type of front road surface is identified later, after the mode is determined a plurality of number of times.

As described above with reference to FIGS. 1 to 3, the suspension control amount calculation device 1002 may calculate the amount of suspension control for passing through the front road surface, based on the determined suspension control mode.

As described above with reference to FIG. 1, the amount of suspension control according to embodiments may be an amount of control applied to the suspension of the vehicle to decelerate the vehicle, in response to the vehicle entering the front road surface. Furthermore, the amount of suspension control according to embodiments may be an amount of control applied to the suspension to absorb and/or dampen a shock applied to the vehicle, in response to the vehicle enters the front road surface.

The amount of suspension control according to embodiments may indicate one of an amount of suspension control calculated based on the first mode, an amount of suspension control calculated based on the second mode, or an amount of suspension control calculated based on the third mode. Furthermore, the amount of suspension control calculated based on the first mode may be greater than the amount of suspension control calculated based on the second mode, and the amount of suspension control calculated based on the third mode may be less than the amount of suspension control calculated based on the second mode.

The amount of suspension control according to embodiments may include at least one of an amount of control for a speed offset of the vehicle, an amount of control for a bump of the vehicle, or an amount of control for a sky hook of the vehicle. The amount of control for the speed offset of the vehicle may be the amount of control for decelerating the vehicle. The amount of control for the bump of the vehicle may be the amount of control for the bump included in the vehicle to absorb a shock of the vehicle. The amount of control for the sky hook of the vehicle may be the amount of control for the sky hook included in the vehicle to implement flat driving sense of the vehicle.

In other words, when the amount of control for the speed offset of the vehicle, the amount of control for the bump of the vehicle, and the amount of control for the sky hook of the vehicle are large, an apparatus 1000 of FIG. 1 may more decelerate the vehicle or absorb a larger shock applied to the vehicle.

Reference number 4000 may indicate an operation where the suspension control amount calculation device 1002 calculates the amount of suspension control for passing through the identified front road surface, based on the first mode.

As described above, the amount of suspension control calculated based on the first mode may be greater than the amount of suspension control calculated based on the second mode. For example, the amount of suspension control based on the first mode may be calculated by adding 100 to the amount of speed offset control included in the amount of suspension control calculated based on the second mode, multiplying the amount of bump control by 1.5, and multiplying the amount of sky hook control by 1.5. In other words, the amount of suspension control based on the first mode may more decrease in the speed of the vehicle than the amount of suspension control based on the second mode, and may be higher in the amount of bump control and the amount of sky hook control than the amount of suspension control based on the second mode.

Through the method described in FIG. 4, the apparatus 1000 according to embodiments may decelerate the vehicle based on the amount of suspension control based on a suitable suspension control mode, in response to the front road surface being identified while the vehicle is traveling. In particular, the apparatus 1000 may determine a suitable suspension control mode in response to a speed of the vehicle passing through the identified front road surface and may accurately and safely decelerate the vehicle.

Figure 5:
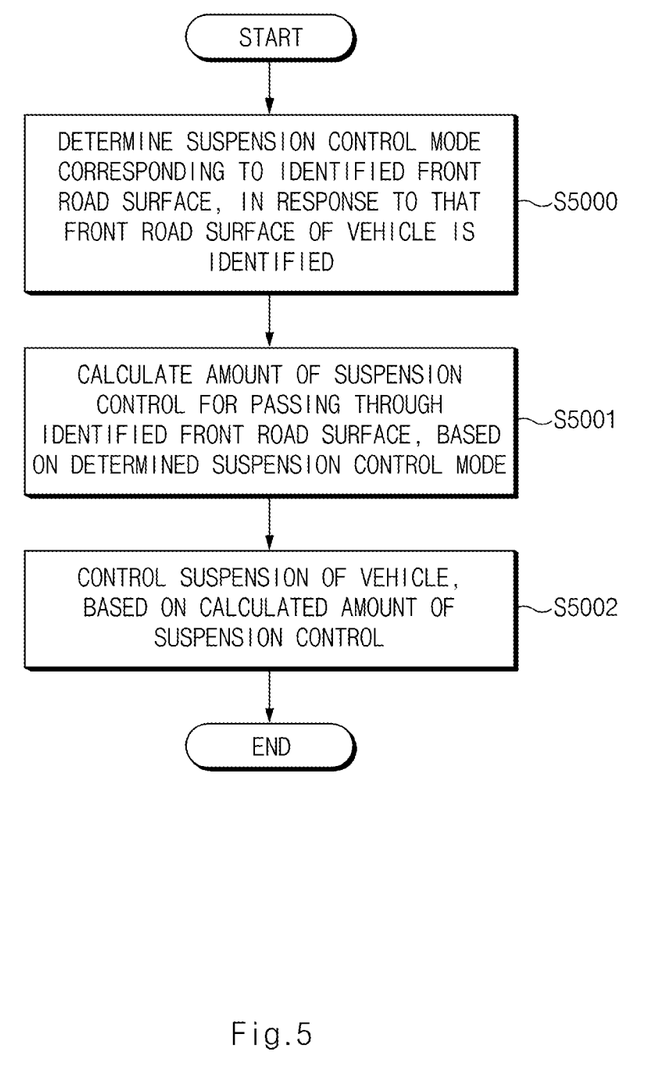
FIG. 5 is a flowchart illustrating an example of a vehicle suspension control method according to embodiments.

FIG. 5 is a flowchart illustrating an example of a vehicle suspension control method according to embodiments.

FIG. 5 is a flowchart illustrating an example of the vehicle suspension control method (or the method) according to embodiments. An apparatus 1000 described in FIGS. 1 to 4 may perform the method described in FIG. 5.

The method according to embodiments may include determining (S5000) a suspension control mode corresponding to an identified front road surface of a vehicle, in response to the front road surface of the vehicle being identified, calculating (S5001) an amount of suspension control for passing through the identified front road surface, based on the determined suspension control mode, and controlling (S5002) a suspension of the vehicle based on the calculated amount of suspension control. The method according to embodiments may further include one or more steps which is or are not described in FIG. 5.

The suspension control mode according to embodiments may indicate one of a first mode, a second mode, or a third mode. The amount of suspension control according to embodiments may be calculated based on one of the first mode, the second mode, or the third mode. A description of the suspension control mode, the amount of suspension control, the first mode, the second mode, and the third mode according to embodiments may be the same or similar to that described above with reference to FIGS. 1 to 4.

According to embodiments, the amount of suspension control calculated based on the first mode may be greater than the amount of suspension control calculated based on the second mode. According to embodiments, the amount of suspension control calculated based on the third mode may be less than the amount of suspension control calculated based on the second mode.

The suspension control mode according to embodiments may be determined as one of the first mode, the second mode, or the third mode based on a count value for the first mode, a count value for the second mode, and a count value for the third mode. The count value according to embodiments may indicate a value counted in response to the suspension control mode corresponding to the identified front road surface being determined. A description of the count value for each mode may be the same or similar to that described above with reference to FIGS. 2 and 3.

The suspension control mode according to embodiments may be determined based on the largest count value among the count value for the first mode, the count value for the second mode, and the count value for the third mode.

Furthermore, the suspension control mode according to embodiments may be determined based on a difference value between the count value for the first mode and the count value for the second mode, a difference value between the count value for the second mode and the count value for the third mode, and a difference value between the count value for the third mode and the count value for the first mode.

According to embodiments, the count value for the first mode, the count value for the second mode, and the count value for the third mode may be counted based on a speed of the vehicle entering the identified front road surface.

The count value for the first mode according to embodiments may be counted in response to the speed of the vehicle entering the identified front road surface being greater than or equal to a predetermined first value. The count value for the third mode according to embodiments may be counted in response to the speed of the vehicle entering the identified front road surface being less than or equal to a predetermined second value. According to embodiments, the predetermined first value may be greater than the predetermined second value. The count value for the second mode according to embodiments may be counted in response to the speed of the vehicle entering the identified front road surface being greater than the predetermined second value and less than the predetermined first value.

The amount of suspension control according to embodiments may include at least one of an amount of control for a speed offset of the vehicle, an amount of control for a bump of the vehicle, or an amount of control for a sky hook of the vehicle.

The identified front road surface according to embodiments may include a road surface on which a speed bump is installed.

Through the method described in FIG. 5, the apparatus 1000 according to embodiments may decelerate the vehicle based on the amount of suspension control based on a suitable suspension control mode, in response to the front road surface being identified while the vehicle is traveling. In particular, the apparatus 1000 may determine a suitable suspension control mode in response to a speed of the vehicle passing through the identified front road surface and may accurately and safely decelerate the vehicle.

Embodiments may predict a behavior of the vehicle and may control a suspension of the vehicle, when the vehicle passes over a front road surface.

Furthermore, embodiments may control the suspension with regard to a speed of the vehicle, when the vehicle passes over the front road surface.

In addition, various effects ascertained directly or indirectly through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A vehicle suspension control apparatus, comprising:
   a mode determination device configured to determine a suspension control mode corresponding to an identified front road surface, in response to the front road surface of a vehicle being identified;
   a suspension control amount calculation device configured to calculate an amount of suspension control for passing over the identified front road surface, based on the determined suspension control mode; and
   a controller configured to control a suspension of the vehicle based on the calculated amount of suspension control.

2. The vehicle suspension control apparatus of claim 1, wherein the suspension control mode indicates one of a first mode, a second mode, or a third mode, and
   wherein the amount of suspension control is calculated based on one of the first mode, the second mode, or the third mode.

3. The vehicle suspension control apparatus of claim 2, wherein an amount of suspension control calculated based on the first mode is greater than an amount of suspension control calculated based on the second mode, and
   wherein an amount of suspension control calculated based on the third mode is less than the amount of suspension control calculated based on the second mode.

4. The vehicle suspension control apparatus of claim 2, wherein the suspension control mode is determined as one of the first mode, the second mode, or the third mode based on a count value for the first mode, a count value for the second mode, and a count value for the third mode, and
   wherein the count value indicates a value counted in response to the suspension control mode corresponding to the identified front road surface being determined.

5. The vehicle suspension control apparatus of claim 4, wherein the suspension control mode is determined based on the largest count value among the count value for the first mode, the count value for the second mode, and the count value for the third mode.

6. The vehicle suspension control apparatus of claim 4, wherein the suspension control mode is determined based on a difference value between the count value for the first mode and the count value for the second mode, a difference value between the count value for the second mode and the count value for the third mode, and a difference value between the count value for the third mode and the count value for the first mode.

7. The vehicle suspension control apparatus of claim 4, wherein the count value for the first mode, the count value for the second mode, and the count value for the third mode are counted based on a speed of the vehicle entering the identified front road surface.

8. The vehicle suspension control apparatus of claim 7,
wherein the count value for the first mode is counted in response to the speed of the vehicle entering the identified front road surface being greater than or equal to a predetermined first value,
wherein the count value for the third mode is counted in response to the speed of the vehicle entering the identified front road surface being less than or equal to a predetermined second value,
wherein the predetermined first value is greater than the predetermined second value, and
wherein the count value for the second mode is counted in response to the speed of the vehicle entering the identified front road surface being greater than the predetermined second value or less than the predetermined first value.

9. The vehicle suspension control apparatus of claim 1, wherein the amount of suspension control includes at least one of an amount of control for a speed offset of the vehicle, an amount of control for a bump of the vehicle, or an amount of control for a sky hook of the vehicle.

10. The vehicle suspension control apparatus of claim 1, wherein the identified front road surface includes a road surface on which a speed bump is installed.

11. A vehicle suspension control method, comprising:
determining a suspension control mode corresponding to an identified front road surface, when the front road surface of a vehicle is identified;
calculating an amount of suspension control for passing over the identified front road surface, based on the determined suspension control mode; and
controlling a suspension of the vehicle based on the calculated amount of suspension control.

12. The vehicle suspension control method of claim 11, wherein the suspension control mode indicates one of a first mode, a second mode, or a third mode,
wherein the amount of suspension control is calculated based on one of the first mode, the second mode, or the third mode.

13. The vehicle suspension control method of claim 12, wherein an amount of suspension control calculated based on the first mode is greater than an amount of suspension control calculated based on the second mode, and
wherein an amount of suspension control calculated based on the third mode is less than the amount of suspension control calculated based on the second mode.

14. The vehicle suspension control method of claim 12, wherein the suspension control mode is determined as one of the first mode, the second mode, or the third mode based on a count value for the first mode, a count value for the second mode, and a count value for the third mode, and
wherein the count value indicates a value counted in response to the suspension control mode corresponding to the identified front road surface being determined.

15. The vehicle suspension control method of claim 14, wherein the suspension control mode is determined based on the largest count value among the count value for the first mode, the count value for the second mode, and the count value for the third mode.

16. The vehicle suspension control method of claim 14, wherein the suspension control mode is determined based on a difference value between the count value for the first mode and the count value for the second mode, a difference value between the count value for the second mode and the count value for the third mode, and a difference value between the count value for the third mode and the count value for the first mode.

17. The vehicle suspension control method of claim 14, wherein the count value for the first mode, the count value for the second mode, and the count value for the third mode are counted based on a speed of the vehicle entering the identified front road surface.

18. The vehicle suspension control method of claim 17,
wherein the count value for the first mode is counted in response to the speed of the vehicle entering the identified front road surface being greater than or equal to a predetermined first value,
wherein the count value for the third mode is counted in response to the speed of the vehicle entering the identified front road surface being less than or equal to a predetermined second value,
wherein the predetermined first value is greater than the predetermined second value, and
wherein the count value for the second mode is counted in response to the speed of the vehicle entering the identified front road surface being greater than the predetermined second value or less than the predetermined first value.

19. The vehicle suspension control method of claim 11, wherein the amount of suspension control includes at least one of an amount of control for a speed offset of the vehicle, an amount of control for a bump of the vehicle, or an amount of control for a sky hook of the vehicle.

20. The vehicle suspension control method of claim 11, wherein the identified front road surface includes a road surface on which a speed bump is installed.

* * * * *